United States Patent
Won

(10) Patent No.: US 11,440,408 B2
(45) Date of Patent: Sep. 13, 2022

(54) ELECTRONIC DEVICE AND TEXT PROVIDING METHOD THEREFOR

(71) Applicant: SAMSUNG ELECTRONICS CO., LTD., Suwon-si (KR)

(72) Inventor: Young-min Won, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 16/754,611

(22) PCT Filed: Oct. 8, 2018

(86) PCT No.: PCT/KR2018/011818
§ 371 (c)(1),
(2) Date: Apr. 8, 2020

(87) PCT Pub. No.: WO2019/107730
PCT Pub. Date: Jun. 6, 2019

(65) Prior Publication Data
US 2021/0197665 A1 Jul. 1, 2021

(30) Foreign Application Priority Data
Nov. 29, 2017 (KR) .................. 10-2017-0161962

(51) Int. Cl.
*B60K 35/00* (2006.01)
*G06F 40/279* (2020.01)
(Continued)

(52) U.S. Cl.
CPC .............. *B60K 35/00* (2013.01); *G06F 3/013* (2013.01); *G06F 40/279* (2020.01); *G06F 40/58* (2020.01);
(Continued)

(58) Field of Classification Search
CPC .............. B60K 35/00; B60K 2370/149; B60K 2370/1529; B60K 2370/21;
(Continued)

(56) References Cited

U.S. PATENT DOCUMENTS 7,389,602 B1 * 6/2008 Simoes .................... G09F 1/00
40/593
8,894,415 B2 * 11/2014 Best ......................... G09B 9/05
434/65
(Continued)

FOREIGN PATENT DOCUMENTS

CN       104597625 A    5/2015
DE    102017103282 A1    9/2017
(Continued)

OTHER PUBLICATIONS

Okumura et al, JP2016095688 MT, Machine translation of the JP2016095688A document (Year: 2016).*
(Continued)

*Primary Examiner* — Richard T Torrente
(74) *Attorney, Agent, or Firm* — Sughrue Mion, PLLC

(57) ABSTRACT

An electronic device is disclosed. The electronic device comprises: a display for displaying an image on a windshield of a transportation means; a first camera for capturing an image of a user riding in the transportation means; a second camera for capturing an image of the outside of the transportation means; and a processor for translating text included in the image captured by the second camera into any other language, and controlling the display such that the translated text is displayed on the windshield, wherein the processor displays the translated text on different areas of the windshield, on the basis of the driving speed of the transportation means and the gaze of the user in the image captured by the first camera.

14 Claims, 12 Drawing Sheets

(51) Int. Cl.
  *G06F 40/58* (2020.01)
  *G06F 3/01* (2006.01)
  *G06V 20/20* (2022.01)
(52) U.S. Cl.
  CPC ........ *G06V 20/20* (2022.01); *B60K 2370/149* (2019.05); *B60K 2370/1529* (2019.05); *B60K 2370/21* (2019.05)
(58) Field of Classification Search
  CPC ........ B60K 2370/163; B60K 2370/166; B60K 2370/167; B60K 2370/178; B60K 2370/194; B60K 2370/52; B60K 37/02; G06F 3/013; G06F 40/279; G06F 40/58; G06F 3/005; G06K 9/00671; B60W 2050/146; B60W 40/105; B60W 50/14
  USPC ........................................................ 348/115
  See application file for complete search history.

(56) References Cited

U.S. PATENT DOCUMENTS

| | | | |
|---|---|---|---|
| 9,275,046 B2 | 3/2016 | Rogowski et al. | |
| 9,421,866 B2 | 8/2016 | Madau et al. | |
| 10,564,434 B2 | 2/2020 | Sato et al. | |
| 2002/0043025 A1* | 4/2002 | Zayas | E01F 9/681 49/33 |
| 2004/0210444 A1* | 10/2004 | Arenburg | G10L 15/005 704/277 |
| 2006/0209190 A1* | 9/2006 | Walters | H04N 7/181 348/148 |
| 2009/0141496 A1* | 6/2009 | Yamamoto | G02B 26/123 362/259 |
| 2011/0234379 A1* | 9/2011 | Lee | H04M 1/72412 340/10.1 |
| 2012/0236046 A1* | 9/2012 | Sugiyama | B60K 35/00 345/690 |
| 2012/0250306 A1* | 10/2012 | Sugiyama | H04N 9/3129 362/231 |
| 2014/0375810 A1* | 12/2014 | Rodriguez | B60Q 1/50 348/148 |
| 2015/0062168 A1* | 3/2015 | Ng-Thow-Hing | G06F 3/017 345/633 |
| 2015/0116977 A1* | 4/2015 | Le Sage | G09F 9/33 362/19 |
| 2015/0120276 A1 | 4/2015 | Wu | |
| 2015/0348550 A1* | 12/2015 | Zhang | G06F 3/167 704/235 |
| 2016/0323722 A1* | 11/2016 | Kovarik | B62D 15/00 |
| 2017/0269370 A1 | 9/2017 | Sato et al. | |
| 2017/0307907 A1* | 10/2017 | Hart | A61B 5/163 |
| 2019/0217868 A1* | 7/2019 | Kim | B60W 50/029 |
| 2021/0188159 A1* | 6/2021 | Fukutaka | B60K 35/00 |

FOREIGN PATENT DOCUMENTS

| | | | | |
|---|---|---|---|---|
| EP | 3184365 A2 | | 6/2017 | |
| JP | 2013-68620 A | | 4/2013 | |
| JP | 2016-95688 A | | 5/2016 | |
| JP | 2016095688 A | * | 5/2016 | ............... G06K 9/32 |
| JP | 2016-161479 A | | 9/2016 | |
| JP | 2016-173802 A | | 9/2016 | |
| KR | 10-0613906 B1 | | 8/2006 | |
| KR | 10-2012-0055011 A | | 5/2012 | |
| KR | 10-2013-0104821 A | | 9/2013 | |
| KR | 10-2014-0058312 A | | 5/2014 | |
| KR | 10-2015-0066036 A | | 6/2015 | |
| KR | 10-1588890 B1 | | 1/2016 | |
| KR | 10-2016-0120104 A | | 10/2016 | |
| KR | 20160120104 A | * | 10/2016 | ............ B60W 40/08 |

OTHER PUBLICATIONS

LEE et al, KR20160120104MT, Machine translation of the KR20160120104A document (Year: 2016).*
International Search Report dated Jan. 8, 2019 issued by the International Searching Authority in counterpart International Application No. PCT/KR2018/011818 (PCT/ISA/210).
Written Opinion dated Jan. 8, 2019 issued by the International Searching Authority in counterpart International Application No. PCT/KR2018/011818 (PCT/ISA/237).
Communication dated Sep. 21, 2020 issued by the European Patent Office in European Application No. 18883765.2.
Communication dated Feb. 17, 2022, issued by the Korean Intellectual Property Office in Korean Patent Application No. 10-2017-0161962.

* cited by examiner

ELECTRONIC DEVICE AND TEXT PROVIDING METHOD THEREFOR

TECHNICAL FIELD

The present disclosure relates generally to an electronic device and text providing method thereof, and more particularly, to an electronic device configured to display text on a windshield provided in a vehicle, and text providing method thereof.

BACKGROUND ART

Due to recent developments in the electronic technology, most automobiles are equipped with navigation, and users are provided with directions to their destinations through navigation.

However, since all buildings, shops, restaurants, etc. are displayed in navigation, a user might have felt uncomfortable. Particularly, when the user drives in a country where using a language that the user does not understand, the user may not be able to find a place the user wants to find only with the navigation.

Accordingly, when a user drives a car, a method for providing information about text existing around the car is required.

DETAILED DESCRIPTION OF THE INVENTION

Technical Problem

The present application is to provide an electronic device configured to translate text existing around a vehicle and display the text on a windshield of the vehicle, and to provide the translated text in different areas of the windshield according to a driving speed of the vehicle, and a text providing method thereof.

Technical Solution

An aspect of the embodiments relates to an electronic device provided in a vehicle includes a display configured to display an image on a windshield of the vehicle, a first camera configured to capture an image of a user riding in the vehicle, a second camera configured to capture an image of the outside of the vehicle, and a processor configured to translate text included in the image captured by the second camera into any other language, and control the display to display the translated text on the windshield, wherein the processor is configured to display the translated text on different areas of the windshield based on a driving speed of the vehicle and the user's gaze captured through the first camera.

The processor may be configured, based on the driving speed being lower than a predetermined speed, to detect the user's gaze captured by the first camera, and display the translated text on an area of the windshield determined based on the user's gaze.

The processor may be configured, based on the detected user's gaze, to identify text to which the user's gaze is directed among at least one text captured by the second camera, translate the identified text into the other language, and display the translated text on an area to which the user's gaze is directed on the windshield.

The processor may be configured, based on the user's gaze being changed, to identify text to which the user's gaze is directed among at least one text captured by the second camera, translate the translated text into the other language, and display the translated text on the area to which the user's gaze is directed on the windshield.

The processor may be configured, based on the driving speed being faster than the predetermined speed, to display the translated text on a predetermined area of the windshield without detecting the user's gaze.

The processor may be configured to identify text transmitted on the predetermined area of the windshield among at least one text captured by the second camera, translate the identified text into the other language, and display the translated text on the predetermined area of the windshield.

The processor may be configured, based on there being text that matches text input by the user among the translated text, to provide feedback for indicating that there is the matched text.

An aspect of the embodiments relates to a method of providing text of an electronic device provided in the vehicle includes capturing an image of a user riding in the vehicle by a first camera, capturing an image of the outside of the vehicle by a second camera, and translating text included in an image captured by the second camera into the other language, and displaying the translated text on the windshield of the vehicle, wherein the displaying comprises, based on a driving speed of the vehicle and the user's gaze captured by the first camera, displaying the translated text on different areas of the windshield.

The displaying may include, based on the driving speed being slower than a predetermined speed, detecting the user's gaze captured by the first camera, and displaying the translated text on an area of the windshield determined by the user's gaze.

The displaying may include, based on the detected user's gaze, identifying text to which the user's gaze is directed among at least one text captured by the second camera, translating the identified text into the other language, and displaying the translated text on the area to which the user's gaze is directed on the windshield.

The displaying may include, based on the user's gaze being changed, identifying text to which the changed user's gaze is directed, translating the identified text into the other language, and displaying the translated text on an area to which the changed user's gaze is directed on the windshield.

The displaying may include, based on the driving speed being faster than the predetermined speed, displaying the translated text on the predetermined area of the windshield without detecting the user's gaze.

The displaying may include identifying text transmitted on the predetermined area of the windshield among at least one text captured by the second camera, translating the identified text into the other language, and displaying the translated text on the predetermined area of the windshield.

The method may further include, based on there being text that matches text input by the user among the translated text, providing feedback for indicating that there is the matched text.

Effect of the Invention

According to various embodiments of the disclosure, text existing the outside the vehicle is translated in real time and displayed on the windshield such that the user may be provided with convenience in driving even when driving a vehicle in an area using a language that the user does not understand. Particularly, according to the driving speed of the vehicle, the translated text is displayed in different areas of the windshield, such that the user may be provided with various information without being distracted by driving.

BEST MODE FOR IMPLEMENTING THE DISCLOSURE

Mode for Implementing the Disclosure

Hereinafter, example embodiments of the present disclosure will be described in greater detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. In addition, in a special case, terms selected by the applicant may be used. In this case, the meaning of the terms will be explained in detail in the corresponding detailed descriptions. Accordingly, the terms used in the description should not necessarily be construed as simple names of the terms, but be defined based on meanings of the terms and overall contents of the present disclosure.

Further, when a certain portion is stated as "comprising" a certain element, unless otherwise stated, this means that the certain portion may include another element, rather than foreclosing the same. Further, in the present disclosure, a 'module' or a 'unit' performs at least one function or operation and may be implemented by hardware or software or a combination of the hardware and the software.

A vehicle in the present disclosure is means of transportation that transports people riding in the vehicle or goods being loaded, such as cars, airplanes, motorcycles, (electric) bicycles, electric wheels, ships, trains, etc. In addition, when the vehicle is a car, the vehicle may include small, medium, large, two-wheeled vehicles and special vehicles, and may include passenger cars, vans, trucks, buses, cargo vehicles, or the like. In addition, a user in the present disclosure is a person riding in a vehicle, and may be a person driving or manipulating the vehicle, such as a driver, a manipulator, a navigator, etc. or a passenger riding in the vehicle.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the invention with unnecessary detail.

Figure 1:
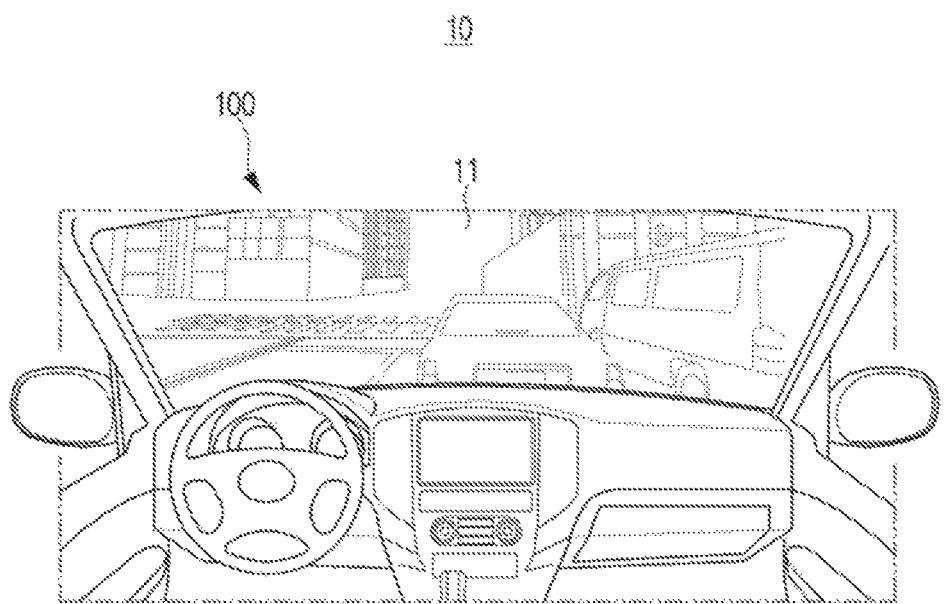
FIG. 1 is a view illustrating an electronic device according to an embodiment of the disclosure.

FIG. 1 is a view illustrating an electronic device according to an embodiment of the disclosure;

Referring to FIG. 1, the electronic device 100 may be mounted on a vehicle 10. In this case, the electronic device 100 may be a separate system provided in the vehicle 10, or may be an assist system such as an advanced driver assist system (ADAS), or may be part of the assist system. In addition, the electronic device 100 may be a control device such as an electronic control unit (ECU) that electronically controls various functions related to an operation of the vehicle 10, or may be part of the control device.

The electronic device 100 may display various screens on a windshield 11 of the vehicle 10 (that is, a front glass of the vehicle 10).

In particular, the electronic device 100 may translate text included in an image capturing the outside of the vehicle 10 into a language that the user can understand, and display the translated text on the windshield.

According to a driving speed, when the user sees text displayed on an object, the electronic device 100 may display a translated text in an area where the text is transmitted through the windshield, or may display the translated text in a specific area of the windshield regardless of the user's gaze.

As described above, according to various embodiments of the disclosure, the text existing the outside of the vehicle 10 is translated in real time and displayed on the windshield, such that the user may be provided with convenience in driving even when driving the vehicle 10 in an area where using a language that the user cannot understand.

Particularly, according to the driving speed of the vehicle 10, the translated text is displayed in different areas of the windshield, such that the user may be provided with various information without being distracted by driving.

Hereinafter, a method of displaying text on the windshield according to various embodiments will be described in detail.

Figure 2:
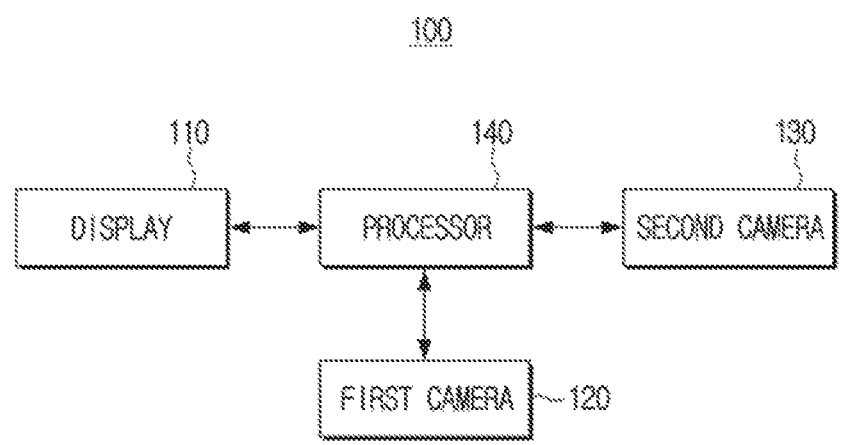
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, the electronic device 100 includes a display 110, a first camera 120, a second camera 130, and a processor 140.

The display 110 displays an image on a windshield of the vehicle 10. For example, the display 110 may display an image comprising text on the windshield of the vehicle 10.

The text may be text in which a text included in an image capturing the outside of the vehicle 10 is translated into a language that the user can understand.

The display 110 may be implemented as a head up display (HUD) to project an image onto the windshield to display a screen. In addition, the display 110 may be implemented as a transparent display disposed on the windshield of the vehicle 10.

The first camera 120 captures a user aboard the vehicle 10. For example, the first camera 120 may be located at an upper portion of the windshield to capture in an inner direction of the vehicle 10. Accordingly, the first camera 120 may capture the user aboard the vehicle 10. Hereinafter, the image captured by the first camera 120 in the description will be referred to as a rear image.

The second camera 130 captures the outside of the vehicle 10. For example, the second camera 130 may be located at an upper portion of the windshield, and may capture in an outward direction of the vehicle 10. In other words, although the second camera 130 is disposed at the same location as the first camera 120, the second camera 130 may capture in the opposite direction to the first camera 120. Accordingly, the second camera 130 may capture various objects existing in front of the vehicle 10. Hereinafter, an image captured by the second camera 130 in the description is referred to as a front image.

The object may include signs that exist in the external environment, signs of buildings, or the like.

The processor 140 controls overall operations of the electronic device 100.

The processor 140 may identify an area through which an object is transmitted on the windshield using the images captured by the first and second cameras 120 and 130. Hereinafter, an area where an object is transmitted is referred to as a transmission area for convenience of description.

The processor 140 may detect a user in an image captured by the first camera 120, that is, a rear image, and obtain coordinates of the user in a three-dimensional space.

For example, the processor 140 may identify an object by detecting an edge from the rear image, and may determine whether the object corresponds to a face, a shape, or the like of human to detect the user from the rear image. In addition, when the first camera 120 is implemented as a depth camera, the processor 140 may detect a distance, an angle, and a direction with respect to the user on the basis of a location where the first camera 120 is located by using the rear image, and acquire a coordinate value of the user in a 3D space.

However, the method described above is just an example, and various algorithms may be used to detect a user and obtain the detected coordinate values of the user.

The processor 140 may detect the user's gaze. So the first camera 120 may include at least one light emitting device (e.g., an IR LED, etc.) capable of emitting light to the user.

The processor 140 may detect eyes of the user in the rear image, and detect the user's gaze by detecting a location where light emitted from a light emitting element is reflected from the eyes of the user in the rear image.

For example, the processor 140 may detect the pupils of the user's eyes and identify a location where the light emitted from the light emitting element is reflected from the cornea of the user. In addition, the processor 140 may set an initial position of eyes using a relative positional relationship between a center of pupil and a position where light is reflected from the cornea. The processor 140 may set the initial position of eyes based on when the user looks at the front. Whether the user looks at the front may be identified according to a ratio of the left and right whites of the eyes (that is, sclera) to the eyes based on iris.

When the user's position is kept constant while only the user's gaze changes, the position of the light reflected from the cornea does not change, but the position of the center of the pupil is changed. Accordingly, the processor 140 may identify the user's gaze by comparing a difference between the two points to a difference between the center position of the pupil and the position where light is reflected at the initial position.

However, the method described above is just an example, and various gaze tracking algorithms may be used for tracking the user's gaze.

In addition, the processor 140 may detect an object in an image captured by the second camera 130, that is, a front image, and acquire coordinates of the object in a 3D space.

For example, the processor 140 may identify an object by detecting an edge in the front image. In addition, when the second camera 130 is implemented as a depth camera, the processor 140 may detect a distance, an angle, a direction, and the like with respect to the object based on a point where the second camera 130 is located by using the front image to acquire coordinate values of the object in the 3D space.

However, the method described above is just an example, and various algorithms may be used to detect the object and acquire coordinate values of the detected object.

The processor 140 may identify an area in which an object is transmitted on the windshield, that is, a transmission area, using coordinate values of the user and the object.

The processor 140 may identify an area where an object at which the user is looking is transmitted and seen on the windshield among at least one object existing the outside the vehicle 10. In other words, the processor 140 may identify an area where the object at which the user is currently looking is transmitted on the windshield in consideration of the user's gaze.

Figure 3:
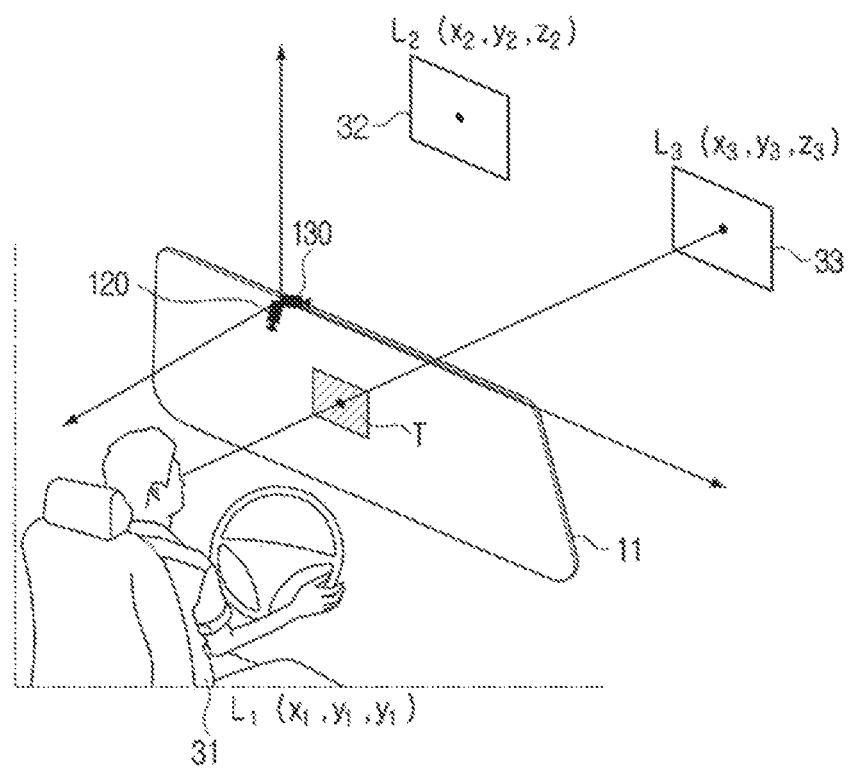
FIGS. 3 and 4 are views illustrating a method of identifying a transmission area according to various embodiments of the disclosure.

For example, as illustrated in FIG. 3, a location where the first and second cameras 120 and 130 are installed is regarded as an origin point, and a position of the user 31 is regarded as L1 (x1, y1, z1), a position of the first object 32 is regarded as L2 (x2, y2, z2), and a position of the second object 33 is L3 (x3, y3, z3).

The processor 140 may identify an object that the user is looking at based on the user's gaze, and may identify an area at which the user is looking, and may identify an area where an object to which the user is looking is transmitted.

For example, as illustrated in FIG. 3, when there are two straight lines having a constant angle in consideration of a viewing angle of the user in a direction toward the user's gaze 34 based on L1 point, a second object 33 exists between the two straight lines. Accordingly, the processor 140 may identify that the user is looking at the second object 33.

The processor 140 determines a straight line connecting L1 and L3 points, and may identify an area T where a surface formed by the windshield 11 and the corresponding straight line meet in a 3D space as an area where the second object 33 to which the user is looking is transmitted on the windshield. The T may be an area within a predetermined distance based on the point where the surface and the straight line meets according to a size of the object and a distance between the user and the object.

The processor 140 may identify the area where the object is transmitted on the windshield without considering the user's gaze, and identify whether the area is within the predetermined area of the windshield.

Not considering the user's gaze may mean identifying the area where the object is transmitted on the windshield by assuming that the user is looking forward without considering the direction where the user is looking at. The predetermined area may mean an area within a predetermined distance based on the center of the windshield.

Figure 4:
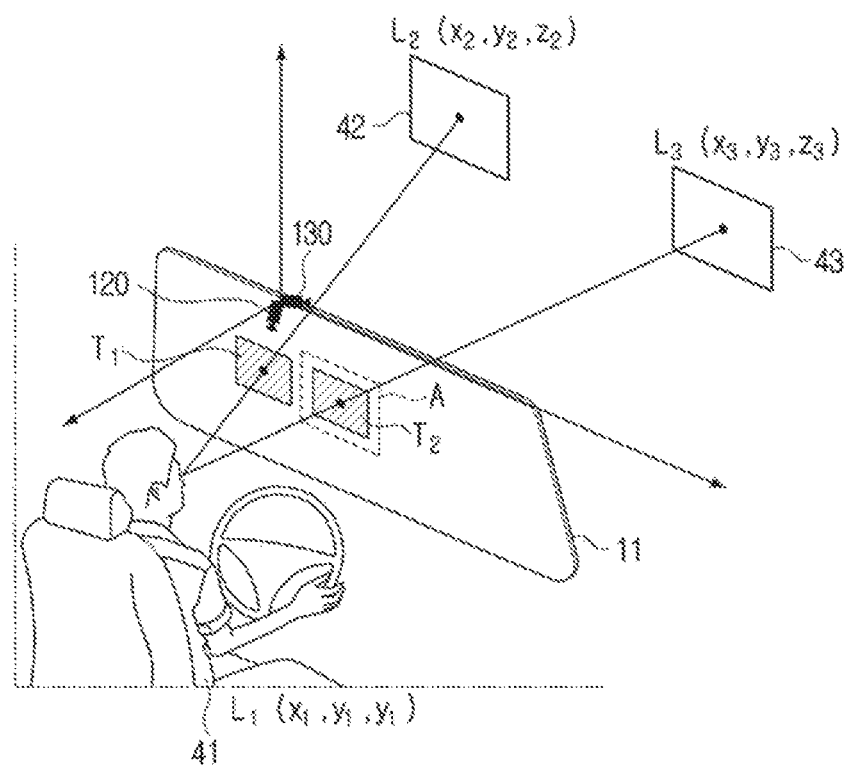

For example, as illustrated in FIG. 4, it assumes that a location where the first and second cameras 120 and 130 are installed is regarded as the origin, and a location of the user 41 is L1 (x1, y1, z1), and a location of a first object 42 is L2 (x2, y2, z2) and a location of a second object 43 is L3 (x3, y3, z3).

The processor 140 may assume that the user is looking in the front direction, and identify the area where the object is transmitted on the windshield based on the location of the user.

For example, the processor 140 may determine a straight line connecting the L1 and L2 points, and may identify an area T1 where a surface formed by the windshield 11 and the corresponding straight line meet in a 3D space as the area where the first object 42 is transmitted on the windshield for the user looking forward. The T1 may be an area within a predetermined distance based on a point where the surface and the straight line meets according to a size of the object, a distance between the user and the object, etc.

In addition, the processor 140 may determine a straight line connecting L1 and L3 points, and may identify an area T2 where a surface formed by the windshield 11 and the corresponding straight line meet in a 3D space as an area where the second object 43 is transmitted on the windshield for the user looking forward. The T2 may be an area within a predetermined distance based on a point where the surface and the straight line meets according to a size of the object, a distance between the user and the object, etc.

In addition, the processor 140 may identify whether the transmission area for each object exists within the predetermined area of the windshield.

For example, as illustrated in FIG. 4, when the predetermined area is equal to A, the processor 140 may determine that the T1 area is not included in the predetermined area A and the T2 area is included in the predetermined area. In other words, among the first and second objects 42 and 43, the processor 140 may identify the area where the second object 43 is transmitted on the windshield 11 is included in the predetermined area.

Through this method, the process may identify that the area where the object is transmitted on the windshield.

Meanwhile, the processor 140 may control the display 110 to translate the text included in the image captured by the second camera 130 into another language and display the translated text on the windshield.

So the processor 140 may recognize the text written on the object captured by the second camera 130 using a text reading algorithm (e.g., an optical character reader (OCR) algorithm, etc.).

In addition, the processor 140 may translate the recognized text into another language.

The language to which the text is translated may be preset by the user. For example, the user may set a language that the user can understand as the language to which the text is translated.

In this case, the electronic device 100 may include a language database for text translation, and the processor 140 may translate the recognized text using the language database.

In addition, the processor 140 may transmit the recognized text to a server (not illustrated) providing a translation service, and may receive the translated text from the server (not illustrated). For this operation, the electronic device 100 may include a communication module for communicating with the server (not illustrated).

Meanwhile, the processor 140 may display the translated text in different areas of the windshield based on a driving speed of the vehicle and the user's gaze captured by the first camera 120.

When the driving speed of the vehicle 10 is slower than the predetermined speed, the processor 140 may detect the user's gaze captured by the first camera 120, and display the translated text in the area of the windshield determined based on the user's gaze.

For example, the processor 140 may identify the text to which the user's gaze is directed among at least one text captured by the second camera 130 based on the detected user's gaze, translate the identified text into another language, and display the translated text in an area that the user's gaze is directed to on the windshield.

In other words, when the driving speed of the vehicle 10 is slower than the predetermined speed, it may have a high possibility that the user recognizes the text coming into view without distracting driving.

Accordingly, when the driving speed of the vehicle 10 is slower than the predetermined speed, the processor 140 preferentially may translate the text at which the user is looking, and display the translated text on the area where the text at which the user is looking is transmitted on the windshield.

The processor 140 may not perform translation on other texts existing in the image captured by the second camera 130 or may perform translation after translating the text that the user is looking at, thereby reducing translation burden to provide text translation in real time.

Meanwhile, the method of identifying an object existing in the area to which the user's gaze is directed, that is text, and an area to which the user's gaze is directed on the windshield, that is an area in which the corresponding object is transmitted on the windshield is the same as the description of FIG. 3.

Figure 5:
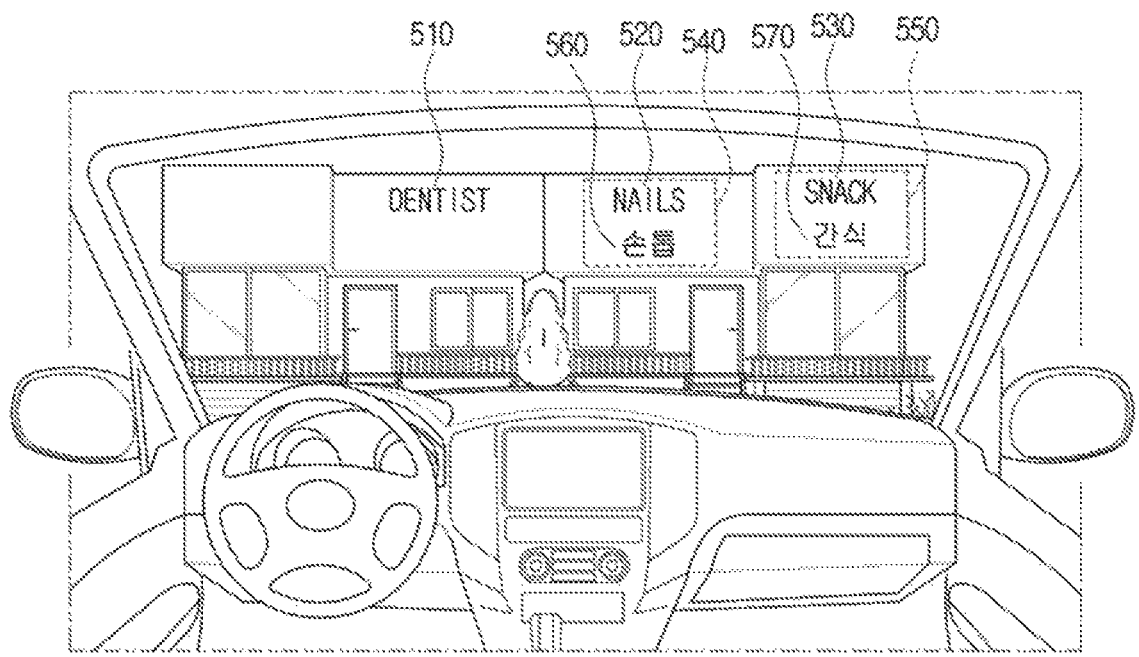
FIGS. 5 to 7 are views illustrating a method of providing a translated text according to various embodiments of the disclosure.

For example, as illustrated in FIG. 5, it assumes that the vehicle 10 moves at a speed lower than a predetermined speed (e.g., 30 km/h), and that "DENTIST 510", "NAILS 520", and "SNACK 530" in the image captured by the second camera 130 are recognized.

In this case, when the "NAILS 520" and the "SNACK 530" exist in the area to which the user's gaze is directed, the processor 140 may translate the "NAILS 520" and "SNACK (530)" existing in the area to which the user's gaze is directed among the recognized texts into Korean.

The processor 140 may display "손톱 560" in which "NAILS 520" is written in Korean in an area 540 where the "NAILS 520" is transmitted on the windshield, and may display "간식 570" in which the "SNACK 530" is written in Korean in an area 550 where the "SNACK 530" is transmitted on the windshield.

Meanwhile, when the user's gaze changes, the processor 140 may identify text to which the changed user's gaze is directed among at least one text captured by the second camera 130, translate the identified text into another language, and display the translated text in the area to which the changed user's gaze is directed on the windshield.

In other words, when the user's gaze is changed and the user is looking the other way, the processor 140 may remove the text previously displayed and translate the text existing in an area where the user is newly looking at to display on the windshield. have.

For example, FIG. 5 assumes that the user is looking at "NAILS" and "SNACK" and changes the gaze to look at "DENTIST".

Figure 6:
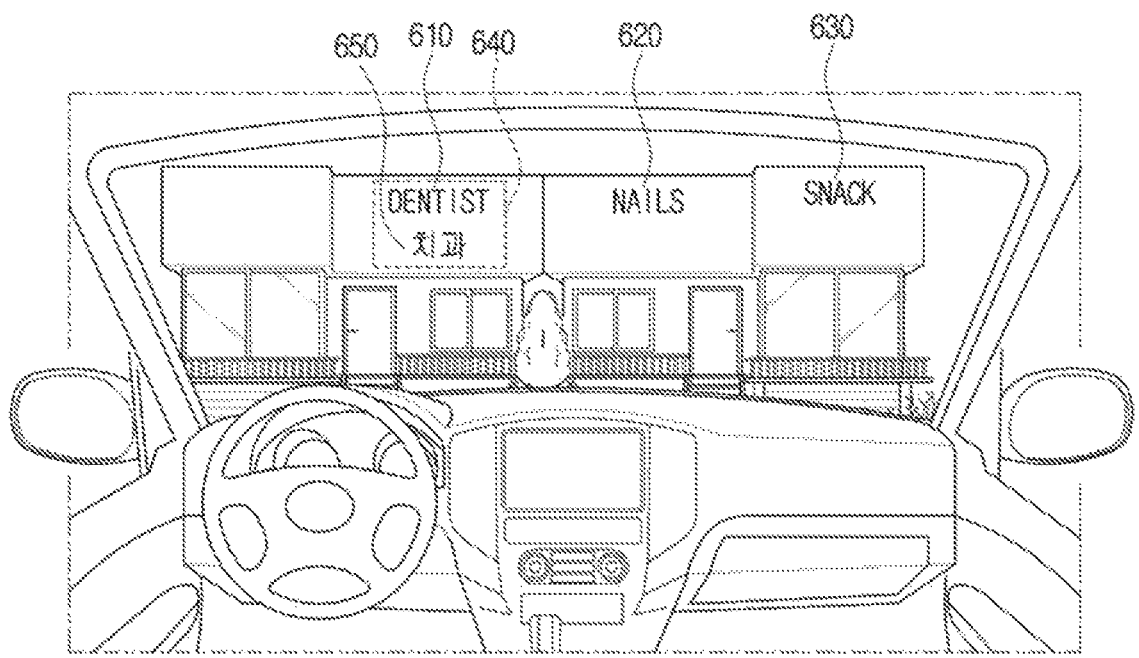

In this case, as illustrated in FIG. 6, the processor 140 may translate "DENTIST 610" existing in an area to which the user's gaze is directed among the recognized texts 610, 620, and 630 into Korean.

In addition, the processor 140 may display "치과 650" in which "DENTIST 610" is written in Korean in an area 640 where "DENTIST 610" is transmitted on the windshield. In this case, the processor 140 may remove the Koreans with respect to "NAILS" and "SNACK", which are previously displayed, on the windshield.

As such, when a driving speed of the vehicle 10 is slower than the predetermined speed, the processor 140 may display the translated text on the windshield in consideration of the user's gaze.

When the driving speed of the vehicle 10 is greater than or equal to the predetermined speed, the processor 140 may display the translated text in the predetermined area of the windshield without detecting the user's gaze. The predetermined area may be an area within a predetermined distance from the center of the windshield.

For example, the processor 140 may identify text transmitted on the predetermined area of the windshield among at least one text captured by the second camera 130, and may translate the identified text into another language to display the translated text on the predetermined area of the windshield.

In other words, when the driving speed of the vehicle 10 is faster than the predetermined speed, the user drives the vehicle 10 at a high speed, and thus the user's gaze is highly likely to be facing forward.

Accordingly, when the driving speed of the vehicle 10 is faster than the predetermined speed, the processor 140 may assume that the user is looking forward without separately detecting the user's gaze, identify the text transmitted on the predetermined area of the windshield, translate the identified text first, and display the translated text on the transmitted area.

The processor 140 may not perform translation on other texts existing in the image captured by the second camera 130 or may perform translation after translating the text at which the user is looking first, thereby reducing a translation burden to provide text translation in real time.

Meanwhile, a method of identifying an area where the object, that is text, is transmitted on the windshield without separately detecting the user's gaze and identifying whether the corresponding area is included in the predetermined area of the windshield is the same as the description of the FIG. 4.

Figure 7:
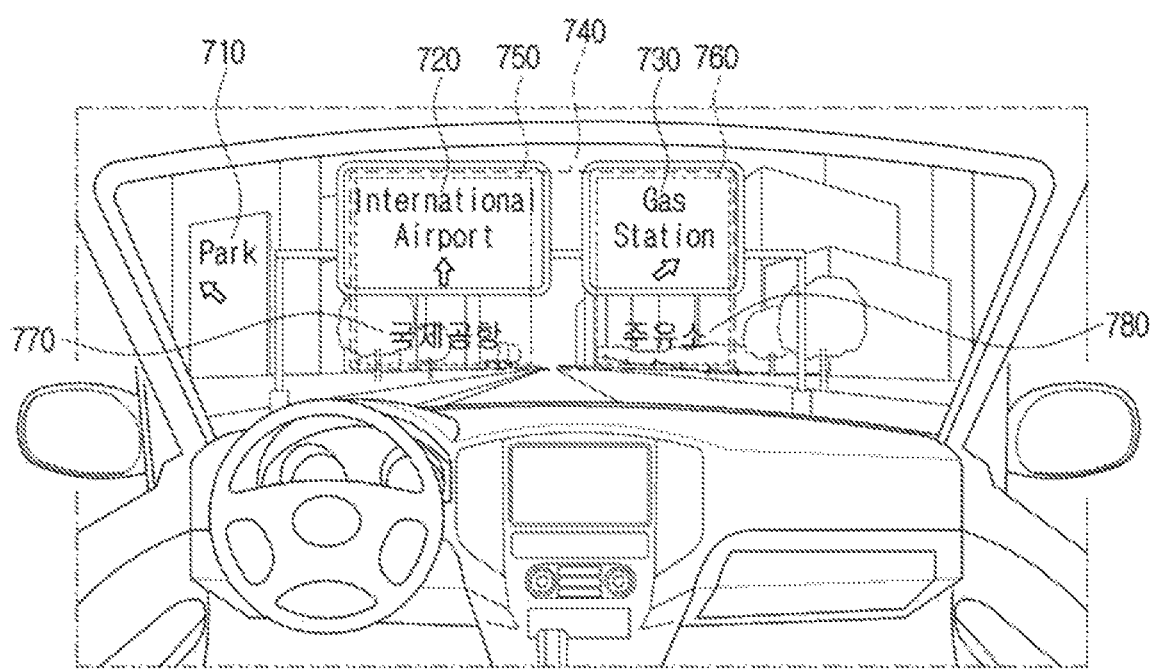

For example, it assumes that the vehicle 10 moves at a speed higher than a predetermined speed (e.g., 30 km/h), and texts such as "Park 710", "International Airport 720" and "Gas Station 730", captured by the second camera 130, are recognized as illustrated in FIG. 7.

Among the texts, the processor 140 may translate "International Airport 720" and "Gas Station 730" in which the area transmitted on the windshield is included in a predetermined area 740 into Korean.

In addition, the processor 140 may display the "국제 공항 770" in which the "International Airport 720" is written in Korean in an area 750 where the "International Airport 720" is transmitted on the windshield, and display "주유소 780" in which "Gas Station 730" is written in Korean in an area 760 where the "Gas Station 730" is transmitted on the windshield. The text "Park 710" in which the area transmitted on the windshield is not included in the predetermined area 740 may not be displayed in Korean.

When there is text that matches text input from the user among the translated text, the processor 140 may provide feedback to indicate that there is a matched text.

For this operation, the processor 140 may receive text from the user. The user may input text in a language that the user can understand, and the text may be name of a destination or a place where the user wants to go or to find.

Figure 8:
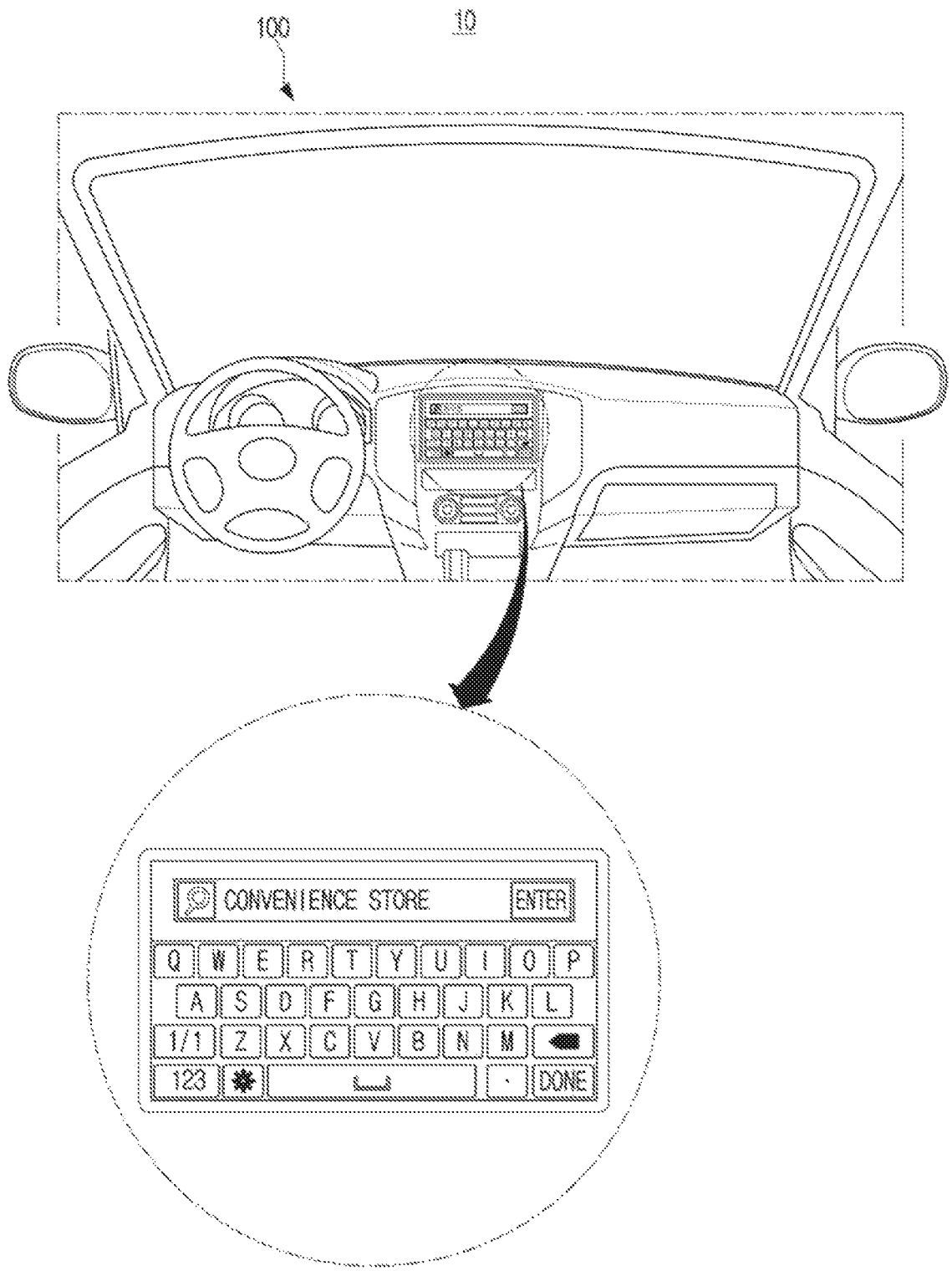
FIG. 8 is a view illustrating a method of receiving a text from a user according to an embodiment of the disclosure.

For example, as illustrated in FIG. 8, the user may input, for example, "편의점 (convenience store)" in Korean through a touch screen provided in a center fascia of the vehicle 10.

However, this is only an example, and the user may input text through another external device, such as a smartphone, or the like, that performs communication with the electronic device 100. In this case, the external device may transmit the input text to the electronic device 100, and the electronic device 100 may include a communication module for communicating with the external device.

A feedback may be provided in various forms. For example, the processor 140 may display colors, shapes, sizes, and the like of the text matching the text input by the user to be distinguished from the other text. For another example, when there is a text that matches the text input by the user, the processor 140 may provide vibration feedback with respect to a handle, a chair, or the like of the vehicle 10, or may output a specific sound through a speaker of the vehicle 10.

Figure 9:
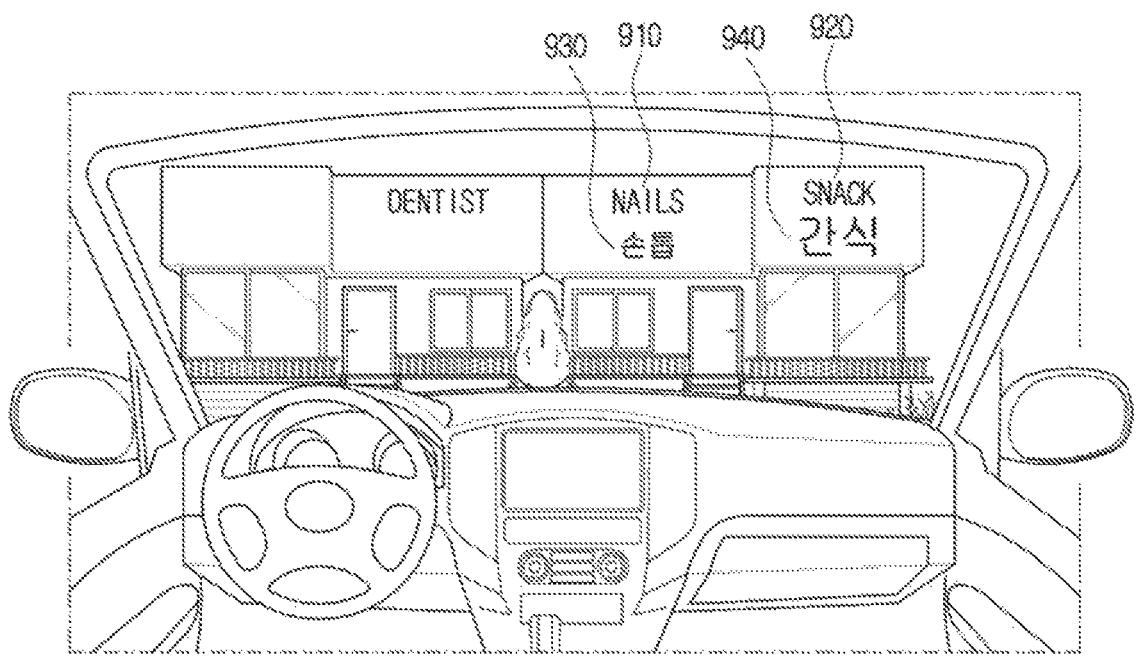
FIGS. 9 and 10 are views illustrating a method of providing text that matches text inputted according to various embodiments of the disclosure.

For example, referring to FIG. 9, as described in FIG. 5, when the texts existing in an area to which the user's gaze is directed are "NAILS 910" and "SNACK 920", the processor 140 may display "손톱 930" that "NAILS 910" is written in Korean in an area where the "NAILS 910" is transmitted on the windshield, and may display "간식 940" that the "SNACK 920" is written in Korean in an area where the "SNACK 920" is transmitted on the windshield.

When the text previously input from the user is "snack", the processor 140 may display the "간식 940" in a larger size than the "손톱 930".

Figure 10:
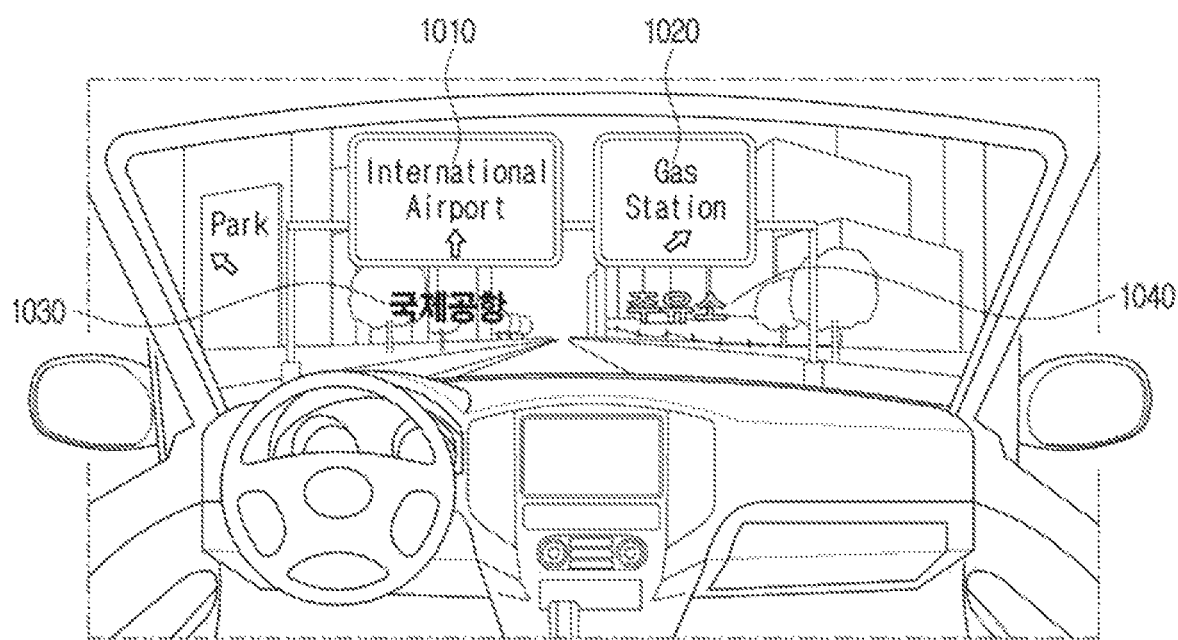

For another example, referring to FIG. 10, when the texts, such as "International Airport 1010" and "Gas Station 1020", included in the predetermined area of the windshield are recognized, the processor 140 may display "국제 공항 1030" that "International Airport 1010" is written in Korean in an area where the "International Airport 1010" is transmitted on the windshield, and may display "주유소 1040" that "Gas Station 1020" is written in Korean in an area where the "Gas Station 1020" is transmitted on the windshield.

When the text previously input by the user is "gas station", the processor 140 may display the "주유소 1040" in a different color from the "국제 공항 1030".

Meanwhile, the example described above has described that while the text is being displayed in different areas according to a driving speed of the vehicle 10, when a text previously input by the user exists, the feedback thereof may be provided.

However, this is merely an example, and the processor 140 may consider only text which has been input in advance by the user and provide feedback thereof.

For example, the processor 140 may recognize the text in the image captured by the second camera 130 and identify whether a text that matches the text input by the user exists among the recognized text.

Languages of the text included in the image captured by the second camera 130 and the text input by the user may be different.

In addition, when the text that matches the text input by the user exists among the recognized text, the processor 140 may provide a feedback thereof.

For example, when the text input by the user exists among the recognized texts, the processor 140 may display only the corresponding text on the area transmitted on the windshield or may display the text together with other texts by making a color, a shape, a size and the like of the text to be distinguished from other text. In addition, when there is text input by the user among the recognized text, the processor 140 may provide vibration feedback with respect to a handle, a chair, or the like of the vehicle 10, or may output a specific sound through a speaker of the vehicle 10.

Figure 11:
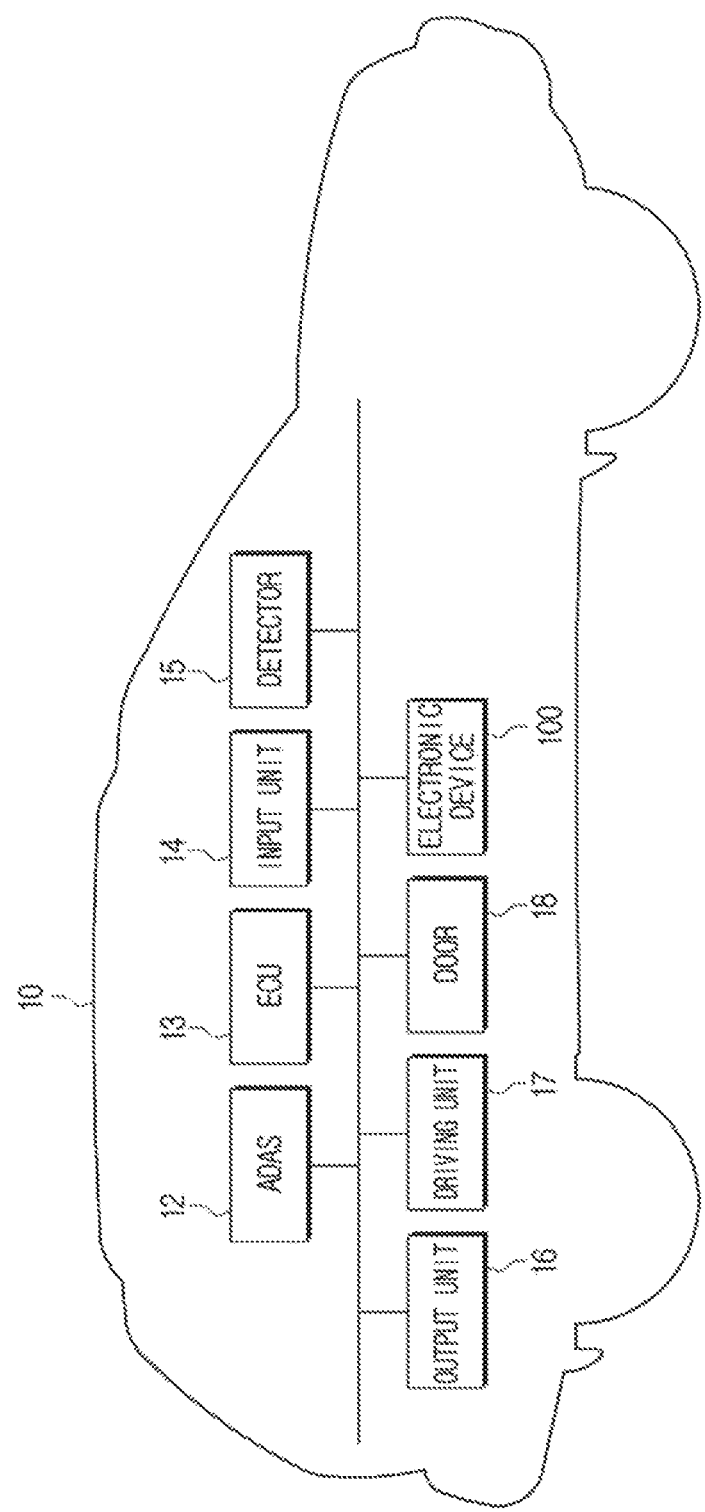
FIG. 11 is a block diagram schematically illustrating a configuration of a vehicle including an electronic device according to an embodiment.

FIG. 11 is a block diagram schematically illustrating a configuration of a vehicle including an electronic device according to an embodiment.

FIG. 11 describes a configuration that the vehicle 10 is implemented by an automobile as an embodiment.

Referring to FIG. 11, the vehicle 10 includes an electronic device 100 according to an embodiment of the disclosure, and may also include an advanced driving assistance system (ADAS) 12, an ECU 13 that performs an overall control in relation to an operation of the vehicle such as driving/braking/driving, etc. of the vehicle 10, an input unit 14, a detector 15, an output unit 16, a driving unit 17, and a door 18.

In FIG. 2, the electronic device 100 is illustrated to be distinguished from the advanced driving assistance system (ADAS) 12 and the ECU 13, but this is merely an embodiment, at least one among the components of the electronic device 100 may be all or part, or all or part of the ADAS 12 according to various embodiments.

The ADAS 12 may be referred to as a driver's driving assistance system or an advanced driving assistance system, and may provide various assistance functions related to a safety of the automobile.

For example, the ADAS 12 may provide an adaptive cruise control function that recognizes a vehicle ahead and automatically maintains a safe distance, a smart cruise control function that recognizes a distance to the vehicle ahead and automatically adjusts a speed, a traffic jam assist function which maintains a certain distance from the vehicle ahead in congested areas of the city, an adaptive high beam function that operates a high light and a low light alternately depending on day and night and whether there is an oncoming vehicle, a night vision function that detects and informs an object, which is invisible to a driver, in advance by using infrared or thermal imaging camera, a blind spot warning function that detects and informs whether there is a vehicle in a blind spot, or the like.

The ECU 13 may, for example, detect a condition of the vehicle 10 to determine an injection amount of fuel and an ignition timing so that an engine of the vehicle 10 does not break down.

For example, the ECU 13 may take into account a rev count of engine, intake air volume, suction pressure, and an opening of an accelerator, may calibrate a water temperature sensor, an oxygen sensor, or the like based on a predetermined ignition timing manifold absolute pressure (MAP) value and fuel injection MAP value, and may adjust an opening and closing rate of the injector.

The input unit 14 may receive various user commands related to the control of the vehicle 10 and may be provided in the vehicle 10. For this operation, the input unit 14 may include a plurality of buttons or a touch screen. In this case, the processor 140 may control various components of the vehicle 10 to operate according to a user command received through the input unit 14.

A detector 15 may detect a surrounding environment of the vehicle 10. For example, the detector 15 may include an object detection sensor such as a lidar sensor, a radar sensor, an ultrasonic sensor, a vision sensor, an infrared sensor, an LED sensor, or the like, or a distance detection sensor.

In addition, the detector 15 may further include at least one among an acceleration sensor, a gyro sensor, an illuminance sensor, a proximity sensor, a pressure sensor, a noise sensor (e.g., microphone), a video sensor (e.g., camera module), a temperature sensor, a shock sensor, a tilt sensor, a 3-axis magnetic sensor, a voice recognition sensor, or a timer.

In addition, the detector 15 may detect battery state information, fuel state information, engine state information (information related to engine state, engine oil state, timing belt state), tire information (tire wear and warpage, etc.), driving speed information, driving direction information, steering information according to rotation of a wheel or steering, vehicle lamp information, vehicle internal temperature and humidity information, vehicle tilt information, and the like. In addition, the detector 15 may identify whether it is daytime or nighttime through the illumination sensor, and may acquire illumination information according to brightness of the daytime or a direction of the user's gaze.

The processor 140 may control various components of the vehicle 10 by using the detecting information acquired in real time by the detector 15.

The output unit 16 may include a display (not illustrated) for displaying various screens and a speaker (not illustrated) for outputting various audio.

The display (not illustrated) may be located on a center fascia, a glass window or a seat, or may be implemented as a head-up display in which an image is projected onto a front glass, that is, the windshield.

Meanwhile, a display (not illustrated) and a speaker (not illustrated) may be components of the electronic device 100.

The driving unit 17 may include a lamp driving unit, a steering driving unit, a brake driving unit, a power source driving unit, a suspension driving unit, and the like to drive components that controls various operations of the vehicle 10 including driving.

Although it is not illustrated that the vehicle 10 may further include a memory (not illustrated) in which various programs and data for controlling the vehicle 10 are stored. At least a part of the memory (not illustrated) may be separately provided in the vehicle 10 or may be included in the ADAS 12 or the ECU 13 of the vehicle 10. However, the memory (not illustrated) provided in the electronic device 100 may store various programs and data for controlling the vehicle 10.

Meanwhile, the processor 140 may be connected to various components included in the vehicle 10 to transmit/receive various data and signals. In addition, the processor 140 may generate and transmit a control command to control various components included in the vehicle. However, this is merely an example, and a separate processor for controlling various components included in the vehicle 10 may be provided in the vehicle 10.

The processor 140 may, for example, may drive an operating system or application program to control components of hardware or software connected to the processor 140 and to perform various data processing and calculations. In addition, the processor 140 may load a command or data received from at least one of the other components to a volatile memory and store diverse data in a non-volatile memory.

For this operation, the processor 140 may be realized a dedicated processor for performing functions (for example, embedded processor) or a generic-purpose processor for performing functions by running one or more software programs stored in a memory device (for example, a CPU, a GPU or an application processor).

In the example above describes that the electronic device 100 is mounted on the vehicle 10, but this is only an example.

In other words, when the electronic device 100 is implemented as an external device mounted on the vehicle 10, the electronic device 100 may be implemented as a smartphone, a tablet personal computer (PC), a personal digital assistant (PDA), a portable PMP, etc., or may be part of such devices, and may be implemented as driving aids such as on board diagnostics (OBD) connected to vehicle connectors (e.g., OBD terminals or OBD connectors, etc.), a navigation, etc., or may be part of such devices.

For example, when the electronic device 100 is implemented as a smartphone, the electronic device 100 is mounted on the vehicle 10 to capture a user through a front camera of the electronic device 100, and to capture the outside of the vehicle 100 through the rear camera. The processor 140 may display the translated text in different areas of the windshield according to a driving speed of the vehicle 10 by performing the same operation described above.

In this case, the electronic device 100 may communicate with a system provided in the vehicle 10 to receive information about the driving speed of the vehicle 10. When displaying the translated text, the electronic device 100 may project an image on the windshield of the vehicle 10 through a projector provided therein, or control the projector provided on the vehicle 10 to project the image onto the windshield.

The embodiment described above has described that when the user sees the text displayed on the object according to a speed of the vehicle, the translated text is displayed in an area where the corresponding text is transmitted on the windshield, or, the translated text is provided in a specific area of the windshield regardless of the user's gaze.

However, this is only an example, and the processor 140 may translate and provide text according to a rotation direction (or angle) of wheels or steering in addition to the user's gaze.

For example, the processor 140 may translate text existing in a direction in which the vehicle 10 rotates according to a rotation direction of wheels or steering detected by the detector 15, and may display the translated text on the windshield.

For example, when the vehicle 10 rotates to the left, the processor 140 may translate the text transmitted to the left area in the windshield and display the translated text on the left area of the windshield. In addition, when the vehicle 10 rotates to the right, the processor 140 may translate the text transmitted to the right area on the windshield and display the translated text in the right area of the windshield.

As such, the translated text may be provided in different areas according to a rotation direction of wheels or steering.

Figure 12:
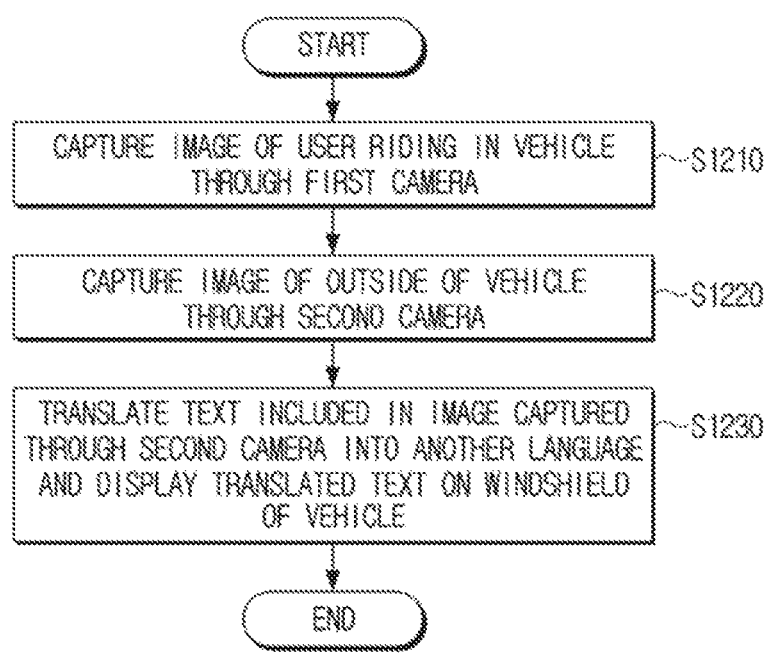
FIG. 12 is a flow chart illustrating a text providing method according to an embodiment of the disclosure.

FIG. 12 is a flow chart illustrating a text providing method according to an embodiment of the disclosure.

Firstly, a user riding in a vehicle is captured through a first camera (S1210), and the outside of the vehicle may be captured through a second camera (S1220).

Text included in an image captured through the second camera may be translated into any other language, and the translated text is displayed on a windshield of the vehicle (S1230).

The translated text may be displayed on different areas of the windshield based on a driving speed of the vehicle and the user's gaze captured through the first camera.

Firstly, in operation of S1230, when the driving speed is slower than a predetermined speed, the user's gaze captured through the first camera may be detected, and the translated text may be displayed on an area of the windshield determined by the user's gaze.

Specifically, based on the detected user's gaze, text to which the user's gaze is directed may be identified among at least one text captured through the second camera, the identified text may be translated into any other language, and the translated text may be displayed on an area of the windshield where the user is looking at.

In addition, when the user's gaze changes, text to which the changed user's gaze is directed may be identified among at least one text captured through the second camera, the identified text may be translated into any other language, and the translated text may be displayed on an area of the windshield where the user is looking at.

In operation of S1230, when the driving speed is greater than the predetermined speed, the translated text may be displayed on a predetermined area of the windshield without detecting the user's gaze.

For example, text transmitted on the predetermined area of the windshield among at least one text may be identified through the second camera, the identified text may be translated into any other language, and the translated text may be displayed on the predetermined area of the windshield.

If there is a text that matches the text input by the user among the translated text, feedback for indicating that there is a matched text may be provided.

A detailed method for displaying text as such is described above.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

What is claimed is:

1. An electronic device provided in a vehicle, the electronic device comprising:
   a display configured to display an image on a windshield of the vehicle;
   a first camera configured to capture an image of a user riding in the vehicle;
   a second camera configured to capture an image of the outside of the vehicle; and
   a processor configured to translate text included in the image captured by the second camera into another language and control the display in order to display the translated text on the windshield,
   wherein the processor is configured to display the translated text on different areas of the windshield based on a comparison of a driving speed of the vehicle with a predetermined speed and a user's gaze captured by the first camera.

2. The electronic device as claimed in claim 1, wherein the processor is configured, based on the driving speed being lower than the predetermined speed, to detect the user's gaze captured by the first camera, and display the translated text on an area of the windshield determined based on the user's gaze.

3. The electronic device as claimed in claim 2, wherein the processor is configured, based on the detected user's gaze, to identify text to which the user's gaze is directed among at least one text captured by the second camera, translate the identified text into the other language, and display the translated text on an area to which the user's gaze is directed on the windshield.

4. The electronic device as claimed in claim 3, wherein the processor is configured, based on the user's gaze being changed, to identify text to which the user's gaze is directed among at least one text captured by the second camera, translate the identified text into the other language, and display the translated text on the area to which the user's gaze is directed on the windshield.

5. The electronic device as claimed in claim 1, wherein the processor is configured, based on the driving speed being faster than the predetermined speed, to display the translated text on a predetermined area of the windshield without detecting the user's gaze.

6. The electronic device as claimed in claim 5, wherein the processor is configured to identify text transmitted on the predetermined area of the windshield among at least one text captured by the second camera, translate the identified text into the other language, and display the translated text on the predetermined area of the windshield.

7. The electronic device as claimed in claim 1, wherein the processor is configured, based on there being text that matches text input by the user among the translated text, to provide feedback for indicating that there is the matched text.

8. A method of providing text of an electronic device provided in a vehicle, the method comprising:
   capturing an image of a user riding in the vehicle by a first camera;
   capturing an image of the outside of the vehicle by a second camera; and
   translating text included in an image captured by the second camera into another language, and displaying the translated text on a windshield of the vehicle,
   wherein the displaying comprises, based on a comparison of a driving speed of the vehicle with a predetermined speed and a user's gaze captured by the first camera, displaying the translated text on different areas of the windshield.

9. The method as claimed in claim 8, wherein the displaying comprises, based on the driving speed being slower than the predetermined speed, detecting the user's gaze captured by the first camera, and displaying the translated text on an area of the windshield determined by the user's gaze.

10. The method as claimed in claim 9, wherein the displaying comprises, based on the detected user's gaze, identifying text to which the user's gaze is directed among at least one text captured by the second camera, translating the identified text into the other language, and displaying the translated text on the area to which the user's gaze is directed on the windshield.

11. The method as claimed in claim 10, wherein the displaying comprises, based on the user's gaze being changed, identifying text to which the changed user's gaze is directed, translating the identified text into the other language, and displaying the translated text on an area to which the changed user's gaze is directed on the windshield.

12. The method as claimed in claim 8, wherein the displaying comprises, based on the driving speed being faster than the predetermined speed, displaying the translated text on a predetermined area of the windshield without detecting the user's gaze.

13. The method as claimed in claim 12, wherein the displaying comprises, identifying text transmitted on the predetermined area of the windshield among at least one text captured by the second camera, translate the identified text into the other language, and displaying the translated text on the predetermined area of the windshield.

14. The method as claimed in claim 8 further comprising, based on there being text that matches text input by the user among the translated text, providing feedback for indicating that there is the matched text.

* * * * *